United States Patent
Friske et al.

(10) Patent No.: US 7,174,353 B2
(45) Date of Patent: Feb. 6, 2007

(54) METHOD AND SYSTEM FOR PRESERVING AN ORIGINAL TABLE SCHEMA

(75) Inventors: Craig A. Friske, San Jose, CA (US); Regina J. Liu, San Jose, CA (US); James A. Ruddy, Gilroy, CA (US); James Z. Teng, San Jose, CA (US); Julie A. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/693,184

(22) Filed: Oct. 24, 2003

(65) Prior Publication Data

US 2005/0091233 A1    Apr. 28, 2005

(51) Int. Cl.
*G06F 17/30* (2006.01)
(52) U.S. Cl. .......................................... 707/203; 707/3
(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 5,625,815 | A |  | 4/1997 | Maier et al. ................ 395/608 |
| 5,873,091 | A | * | 2/1999 | Garth et al. ................ 707/102 |
| 5,950,210 | A |  | 9/1999 | Nelson ........................ 707/203 |
| 5,970,503 | A |  | 10/1999 | Eisenberg ................... 707/203 |
| 6,038,569 | A |  | 3/2000 | Beavin et al. .............. 707/203 |
| 6,151,604 | A |  | 11/2000 | Wlaschin et al. .......... 707/100 |
| 6,321,236 | B1 |  | 11/2001 | Zollinger et al. .......... 707/203 |
| 6,397,351 | B1 |  | 5/2002 | Miller et al. .................. 714/13 |
| 6,460,052 | B1 |  | 10/2002 | Thomas et al. ............ 707/203 |
| 6,529,921 | B1 |  | 3/2003 | Berkowitz et al. ......... 707/500 |
| 6,553,380 | B2 |  | 4/2003 | Minder ....................... 707/100 |
| 2002/0147725 | A1 |  | 10/2002 | Janssen et al. ............. 707/100 |
| 2002/0184207 | A1 | * | 12/2002 | Anderson et al. .............. 707/4 |

OTHER PUBLICATIONS

Connie Dialeris, Joyce Fee, Lance Ashdown et. al., Oracle 8i Backup and Recovery Guide, Feb. 1999, Release 8.1.5, Chapters 3 and 4.*
Lefty Leverenz, Diana Rehfield et. al., Oracle 8i Concepts, Feb. 1999, Release 8.1.5, Chapter 32.*
Wylie Wong, Oracle ships 8i database, Mar. 1, 1999, CNET News.com.*

* cited by examiner

*Primary Examiner*—Mohammad Ali
(74) *Attorney, Agent, or Firm*—Sawyer Law Group LLP

(57) ABSTRACT

The present invention is related to a method and system for preserving an original table schema for a table in a database system that supports dynamic table schema changes. The method and system includes storing the original table schema for the table in a designated table prior to performing a schema change on the table. By storing the original table schema in the designated table, a backup copy of the table that includes rows which are not self-describing can be used for data recovery.

12 Claims, 3 Drawing Sheets

METHOD AND SYSTEM FOR PRESERVING AN ORIGINAL TABLE SCHEMA

FIELD OF THE INVENTION

The present invention relates to database management systems and more particularly to a method and system for preserving an original table schema in a database system that supports dynamic table schema changes.

BACKGROUND OF THE INVENTION

A schema provides a definition of a database table. The schema defines the structure and the type of contents that each data element within the structure can contain. For example, the schema for a structure that includes a table defines the size of a column in the table and the type of data in the column. The schema is generally stored in the database management system's (DBMS's) system database or catalog.

Modern database management systems, such as the DB2™ system developed by International Business Machines of Armonk, N.Y., support dynamic table schema charges by introducing self-describing table rows. In this system, each table is associated with a metadata table that contains information related to the table and each row's existing schema. The metadata is stored with the table, and therefore, each row is self-describing, i.e., reference to any source besides the table is not required. When the schema is altered, the latest, i.e., post alteration, table definition is recorded in the catalog. For any new row inserted into the table after the schema alteration, the corresponding metadata reflects the latest table definition. An existing row's metadata remains unchanged until a request to update that row is executed. At that time, the existing row's metadata is updated to reflect the latest table definition. Otherwise, the existing row's metadata reflects the pre-alteration table definition.

The above described dynamic schema alteration function performs well for its intended purpose and it is desirable to implement such functionality in a database system that includes tables that are not self-describing, i.e., table definitions are not stored with the table data. After the dynamic schema alteration function is invoked for the first time in such a database system, i.e., when the schema is altered for the first time, and when a first update to the table is performed, the DBMS appends both the old, i.e., original, and the new table definitions to the metadata table. Note that the table definitions are appended at this time for purposes of optimization. Those skilled in the art recognize that the table definitions can be appended at a different time, e.g., when the schema is first changed. Thus, after the first table update, each row is self-describing. As new rows are inserted into the table, they are stored based on the new table definition. As preexisting rows are updated, they are converted to the new table definition.

By storing table definitions, original and current, in the metadata and updating the metadata for a row "on-the-fly," dynamic schema changes are performed without impairing database performance and/or availability. Each backup taken after the first update following the first schema change can be used as the source for data recovery or to clone another DBMS with the latest table definitions because the tables are self-describing. Problems arise, however, if the source for data recovery is a backup taken prior to the first update following the first schema change. In this backup, the tables are not self-describing, i.e., the original and current table definitions not appended to the metadata. Moreover, the original table definition is not stored in the catalog after the table definition has been altered. Accordingly, no record of the original table definition exists for this backup, and therefore, it cannot be used for data recovery.

Accordingly, a need exists for a system and method for preserving an original table schema in a database system that supports dynamic schema changes. The system and method should allow the database system to preserve a table definition before any alteration to the schema. The system and method should also allow any backup copy of the database, including one taken prior to a first update following a first schema change, to be used for data recovery. The present invention addresses such a need.

SUMMARY OF THE INVENTION

A method and system for preserving an original table schema for a table in a database system that supports dynamic table schema changes is disclosed. The method and system includes storing the original table schema for the table in a designated table prior to performing a schema change on the table.

By storing the original table schema in the designated table, a backup copy of the table that does not contain the original table definition can be used for data recovery. The original table schema can be removed from the designated table when all backups taken before the first update following the first table schema change become obsolete and/or unsuitable for data recovery.

DETAILED DESCRIPTION

The present invention relates to database management systems and more particularly to a method and system for preserving an original table schema in a database system that supports dynamic schema changes. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to the present invention, an original table definition, i.e. schema, is recorded in a table at or prior to a first schema change. The table is preferably stored in the database catalog along with other catalog tables. Once the first schema change is invoked, the dynamic schema change function converts all inserts or updates to the new format, i.e., self-describing rows, as described above. The existing rows that are not self-describing are defined by the original table definition stored in the table. Accordingly, each row, whether newly inserted, updated, or preexisting, is defined. Any backup copy of the database can now be used for data recovery.

Figure 1:
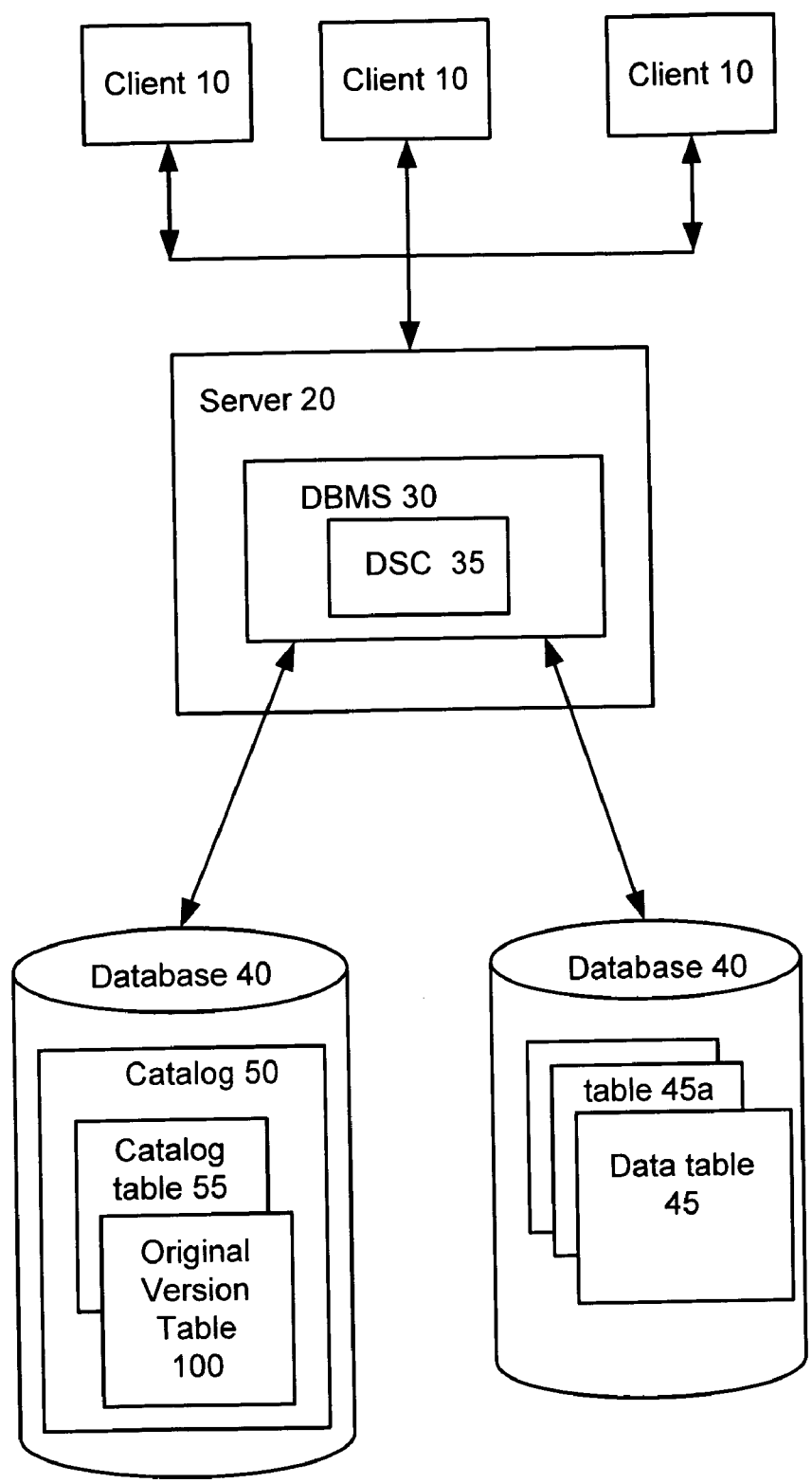
FIG. 1 is a block diagram of a database system according to a preferred embodiment of the present invention.

To describe in more detail the present invention, please refer now to FIG. 1, which is a block diagram of a database system according to a preferred embodiment of the present invention. As is shown, a plurality of clients 10 are coupled to a database 40 via a server 20. The server 20 includes a database management system (DBMS) 30, such as the DB2™ system developed by IBM of Armonk, N.Y. The DBMS 30 manages requests from a client 10 to access data stored in data tables 45 in the database 40, as well as the overall administration of the database 40. The DBMS 30 includes a dynamic schema change (DSC) mechanism 35 for supporting the dynamic schema alteration functionality.

Information related to the data is typically stored in a catalog 50 in the database 40. The catalog 50 typically includes catalog tables 55 describing the data tables 45 in the database system. Thus, definitions for data tables 45 are typically stored in a catalog table 55, as well as other information.

According to a preferred embodiment of the present invention, the catalog 50 includes an Original Version (OV) Table 100. The OV Table 100 is used to store a table definition immediately prior to a first schema alteration performed by the DSC mechanism 35. Although the OV Table 100 is preferably located in the catalog 50, those skilled in the art would readily appreciate that the OV Table 100 could be stored elsewhere in the database 40.

Figure 2:
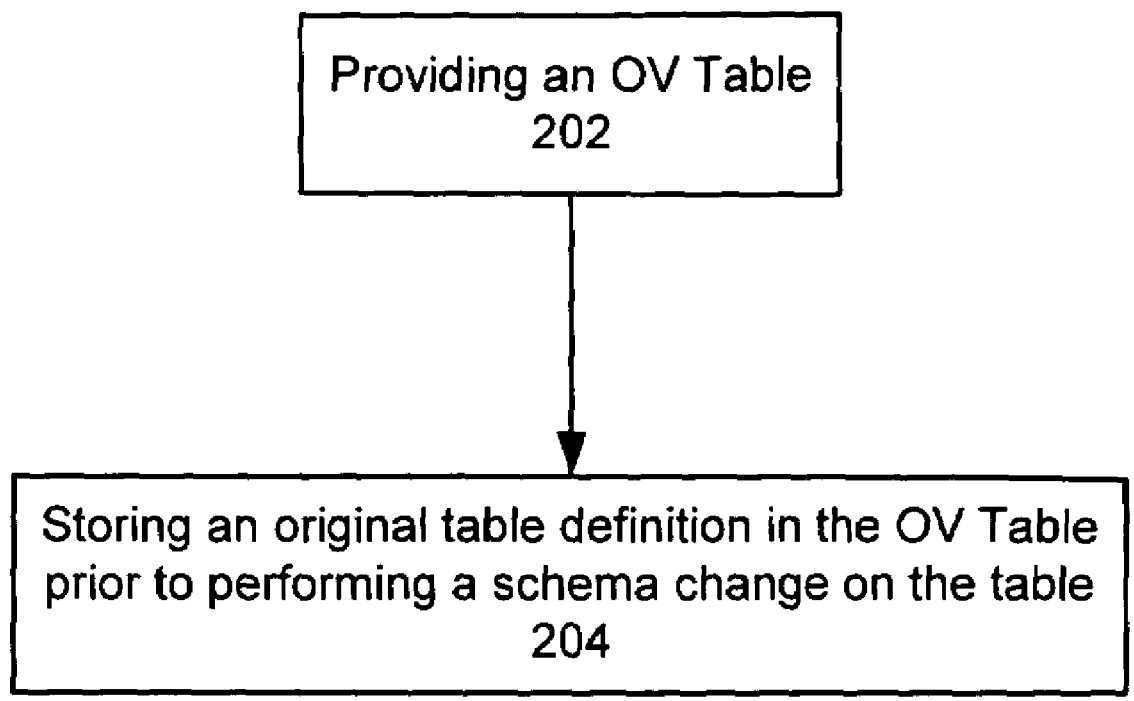
FIG. 2 is a flowchart illustrating a method for preserving an original table definition in a database system that supports dynamic schema changes according to a preferred embodiment of the present invention.

FIG. 2 illustrates a flowchart illustrating a method for preserving an original table definition in a database system that supports dynamic schema changes according to a preferred embodiment of the present invention. The method begins by providing an Original Version (OV) Table 100 in step 202. As noted above, the OV Table 100 is preferably located in the catalog 50 along with other catalog tables (not shown). Next, in step 204, the original table schema for the data table 45a is stored in the OV Table 100 prior to a first schema change to the data table 45a. Once the first schema change has been performed, the catalog table 55 is modified to reflect the new table schema.

From this point forward, any row inserted into the table 45a or any row updated will be defined by the new schema. Moreover, each row will be, or will be converted into, a self-describing row as described above, i.e., metadata describing the row's schema is appended. After a first table update, e.g., insert row or row update, the original table schema and new table schema are appended to the metadata. Thus, preexisting rows that are not updated will continue to be defined by the original table schema, found either in the metadata or in the OV Table 100.

Figure 3:
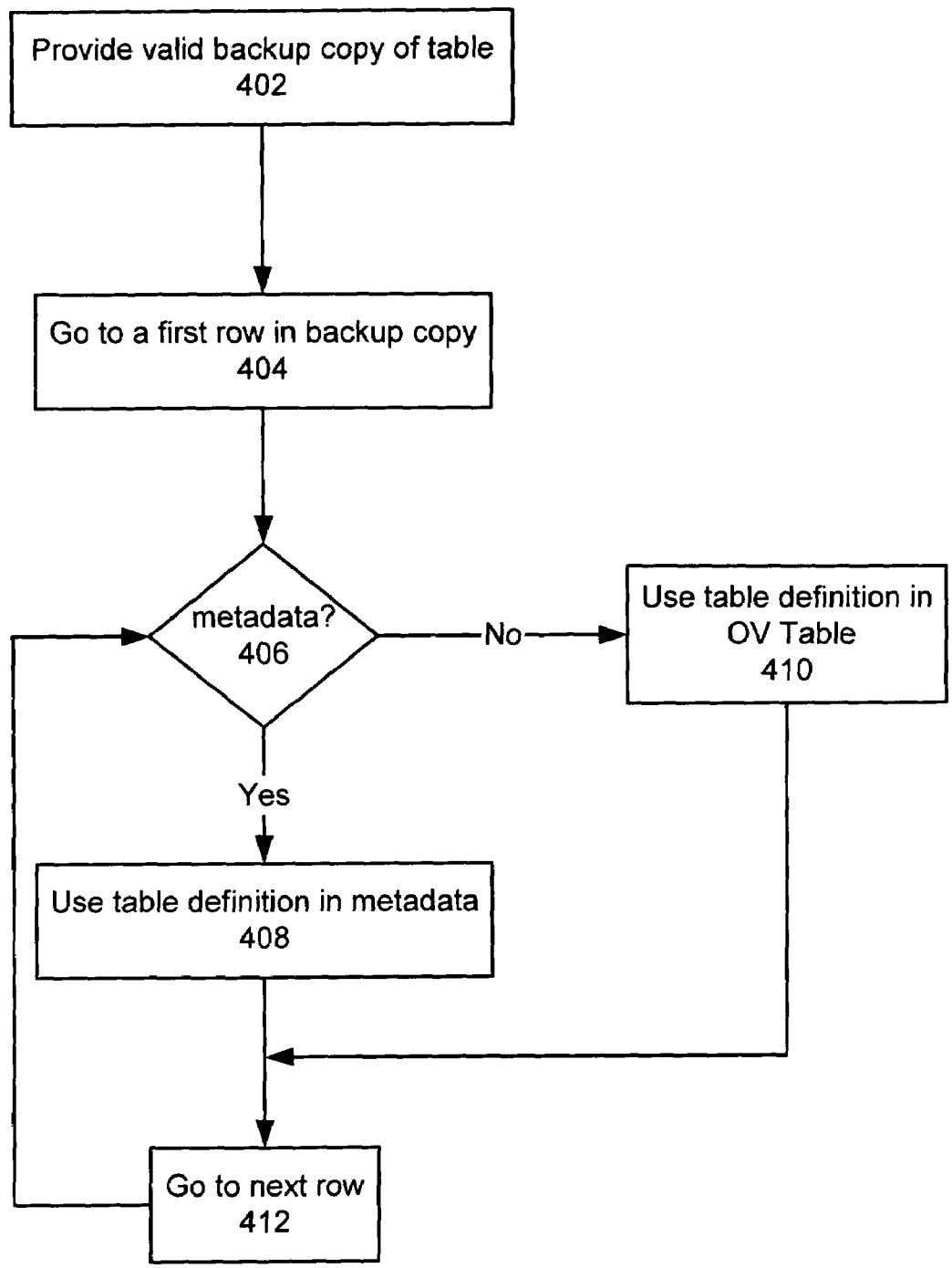
FIG. 3 is a flowchart illustrating a method for rebuilding a table according to a preferred embodiment of the present invention.

During a data recovery process, the DBMS 30 can utilize any backup copy for a table 45a because each row is now defined by the metadata or by the original schema stored in the OV Table 100. FIG. 3 is a flowchart illustrating a process for rebuilding a table 45a according to a preferred embodiment of the present invention. In step 402, a valid backup copy of the table is provided. The valid backup copy is an image of the table 45a that includes data that can be used to rebuild the table 45a, i.e., the data is not corrupted or otherwise unsuitable for data recovery. In step 404, the DBMS 30 refers to a first row in the backup copy, and in step 406 determines whether the row contains metadata. If metadata exists, then the table definition in the metadata is utilized to rebuild the row in step 408. If metadata does not exist, e.g., because the backup was taken prior to the first table update following the first schema change, then the table definition in the OV Table 100 is used in step 410. In step 412, a next row is accessed and steps 406 to 410 are repeated until the entire table 45a has been rebuilt. At the point when all rows in the table 45a have all necessary table definitions describing the data rows, i.e., the metadata describes all the rows, the DBMS 30 will remove the original table schema for that table 45a from the OV Table 100.

Although the present invention has been described in accordance with the embodiment shown, one of ordinary skill in the art will readily recognize that there could be variations to the embodiment and those variations would be within the spirit and scope of the present invention. For example, while the preferred embodiment involves a DB2 system that supports dynamic schema changes, those skilled in the art would readily appreciate that the principles of the present invention could be utilized in a variety of database management systems. Accordingly, many modifications may be made by one of ordinary skill in the art without departing from the spirit and scope of the appended claims.

What is claimed is:

1. A method for preserving an original schema of a table comprising a plurality of rows, the method comprising:

storing the original schema of the table in a designated table prior to performing a first schema change on the table, wherein the plurality of rows in the table are not self-describing prior to performance of the first schema change;

performing the first schema change on the table to create a new schema for the table;

defining each of one or more rows that are inserted into or updated in the table after performance of the first schema change using the new schema;

making each of the one or more inserted or updated rows a self-describing row by storing metadata describing the new schema in the row; and rebuilding the table using a valid backup copy of the table, wherein, when a row of the valid backup copy is self-describing, metadata stored in the row is used to rebuild a corresponding row of the table, wherein, when the row of the valid backup copy is not self-describing, the original schema stored in the designated table is used to rebuild the corresponding row of the table, and wherein a backup copy of the table is valid when data in the backup copy is not corrupted or otherwise unsuitable for data recovery.

2. The method of claim 1, further comprising:

removing the original schema of the table from the designated table responsive to all of the rows in the table being self describing.

3. The method of claim 1, wherein the designated table is a catalog table.

4. The method of claim 1, wherein having each row in the table defined by metadata stored in the row or by the original schema stored in the designated table allows a backup copy of the table that was created after performance of the first schema change and before insertion or update of the one or more rows to be used for data recovery.

5. A computer program product comprising a computer readable storage medium, the computer readable storage medium including a computer readable program for preserving an original schema of a table comprising a plurality of rows, wherein the computer readable program when executed on a computer causes the computer to:

store the original schema of the table in a designated table prior to performing a first schema change on the table, wherein the plurality of rows in the table are not self-describing
prior to performance of the first schema change;
 perform the first schema change on the table to create a new schema for the table;
 define each of one or more rows that are inserted into or updated in the table after performance of the first schema change using the new schema;
 make each of the one or more inserted or updated rows a self-describing row by storing metadata describing the new schema in the row; and
 rebuild the table using a valid backup copy of the table, wherein, when a row of the valid backup copy is self-describing, metadata stored in the row is used to rebuild a corresponding row of the table, and
 wherein, when the row of the valid backup copy is not self-describing, the original schema stored in the designated table is used to rebuild the corresponding row of the table, and
 wherein a backup copy of the table is valid when data in the backup copy is not corrupted or otherwise unsuitable for data recovery.

6. The computer program product of claim 5, wherein the computer readable program when executed on the computer further causes the computer to:
 remove the original schema of the table from the designated table responsive to all of the rows in the table being self describing.

7. The computer program product of claim 5, wherein the designated table is a catalog table.

8. The computer program product of claim 5, wherein having each row in the table defined by metadata stored in the row or by the original schema stored in the designated table allows a backup copy of the table that was created after performance of the first schema change and before insertion or update of the one or more rows to be used for data recovery.

9. A system for preserving an original schema of a table comprising a plurality of rows, the system comprising:
 a designated table operable to store the original schema of the table, the original schema being stored in the designated table prior to performance of a first schema change on the table,
 wherein the plurality of rows in the table are not self-describing prior to performance of the first schema change;
 a first mechanism operable to:
  perform the first schema change on the table to create a new schema for the table,
  define each of one or more rows that are inserted into or updated in the table after performance of the first schema change using the new schema, and
  make each of the one or more inserted or updated rows a self-describing row by storing metadata describing the new schema in the row; and
 a second mechanism operable to rebuild the table using a valid backup copy of the table,
 wherein, when a row of the valid backup copy is self-describing, metadata stored in the row is used to rebuild a corresponding row of the table,
 wherein, when the row of the valid backup copy is not self-describing, the original schema stored in the designated table is used to rebuild the corresponding row of the table, and
 wherein a backup copy of the table is valid when data in the backup copy is not corrupted or otherwise unsuitable for data recovery.

10. The system of claim 9, further comprising:
 a third mechanism operable to remove the original schema of the table from the designated table responsive to all of the rows in the table being self-describing.

11. The system of claim 9, wherein the designated table is a catalog table.

12. The system of claim 9, wherein having each row in the table defined by metadata stored in the row or by the original schema stored in the designated table allows a backup copy of the table that was created after performance of the first schema change and before insertion or update of the one or more rows to be used for data recovery.

* * * * *